United States Patent [19]
Cartwright

[11] 3,803,747
[45] Apr. 16, 1974

[54] FISHING LURE
[76] Inventor: Earl Cartwright, 86 House Dr., Akron, Ohio 44319
[22] Filed: Mar. 31, 1972
[21] Appl. No.: 240,120

[52] U.S. Cl............... 43/42.28, 43/42.44, 43/44.81
[51] Int. Cl............................................ A01k 85/00
[58] Field of Search............. 43/42.28, 42.37, 42.44, 43/44.81, 44.97

[56] References Cited
UNITED STATES PATENTS

| | | | |
|---|---|---|---|
| 2,590,461 | 3/1952 | Rasch | 43/42.28 X |
| 2,955,378 | 10/1960 | Burke | 43/42.28 |
| 2,484,744 | 10/1949 | Roman | 43/42.28 X |
| 3,323,248 | 6/1967 | Sutryn | 43/42.28 X |
| 2,639,537 | 5/1953 | Wagner | 43/42.28 X |
| 1,884,053 | 10/1932 | McGarraugh | 43/42.28 |
| 3,382,601 | 5/1968 | Green | 43/44.97 X |

FOREIGN PATENTS OR APPLICATIONS

| | | | |
|---|---|---|---|
| 889,397 | 10/1943 | France | 43/44.81 |
| 527,082 | 7/1956 | Canada | 43/42.28 |

*Primary Examiner*—James H. Czerwonky
*Attorney, Agent, or Firm*—Oldham & Oldham Co.

[57] ABSTRACT

A lure for fishing on stream and lake bottoms. The lure has a weighted body, a cork or other freely slidable buoyant member pivotally attached to the body near the rear thereof, and a hook attached by a swivel connection at the rear of the body. Slit rubber skirting, feathers or other dressings may be attached to the body.

11 Claims, 8 Drawing Figures

PATENTED APR 16 1974 3,803,747

FISHING LURE

The present invention relates to a fishing lure adapted for use in bottom fishing and, more particularly, to such a lure which may be pulled along the bottom of a lake or stream without snagging or becoming intangled with roots, stumps, logs, or the like.

When fishing for fish which inhabit the bottoms of lakes or streams, problems are encountered with the frequent snagging of the fishing lures on rocks, sticks or debris on the bottom surface. This is due in part to the direction in which the lure has a tendency to move as it encounters an obstacle and in part to the turning or rotation of the lure establishing the hook in a horizontal or downwardly directed position, further increasing the danger of snagging.

It is the primary object of the present invention to provide a lure for bottom fishing which is less likely to snag than are conventional lures or jigs.

It is also an object of the invention to provide a fishing lure for bottom fishing which tends to remain in an upright position either while at rest or as the lure is moved along the bottom of the lake or stream.

Yet another object of the invention is the provision of a fishing lure for bottom fishing which is of relatively simple and inexpensive construction.

Yet another object of the invention is the provision of a lure for bottom fishing which is attractive in appearance to the fish and can be used either with or without live bait.

The above and other objects of the invention are achieved by providing a fishing lure which consists, essentially, of a weighted body member, a cork or other buoyant member attached to the body member near the rear thereof, a hook extending rearwardly from the body member and being attached thereto by a swivel connection, and skirting or other dressing covering at least the rear portion of the body member to provide an appearance which is attractive to the fish.

For a more complete understanding of the invention and the objects and advantages thereof reference should be had to the accompanying drawing and the following detailed description wherein there is shown a preferred embodiment of the invention.

Figure 1:
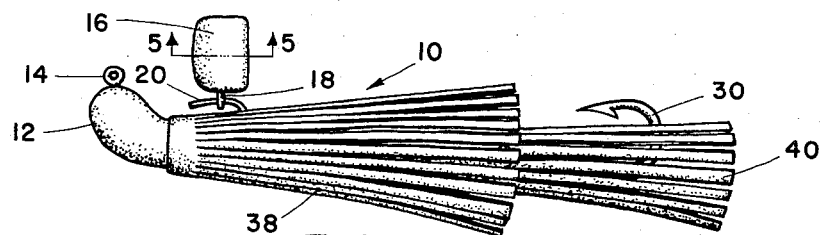
FIG. 1 is a side elevational view of a first embodiment of the lure of my invention.
Figure 2:
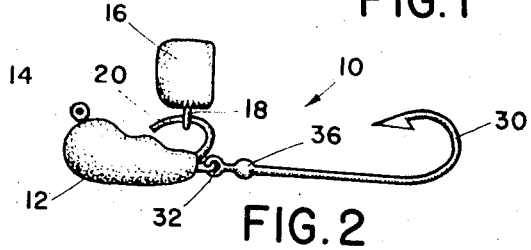
FIG. 2 is a side elevational view of the lure of FIG. 1 but with the skirting removed for clarity.
Figure 3:
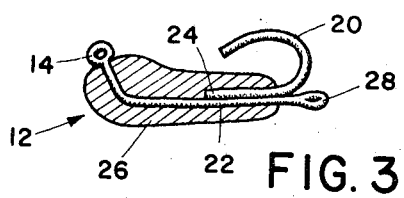
FIG. 3 is a longitudinal sectional view of the body portion of the lure of FIG. 1.
Figure 4:
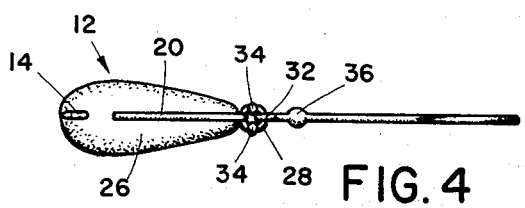
FIG. 4 is a top plan view of the lure of FIG. 1 with the skirting and buoyant member removed for clarity.
Figure 5:
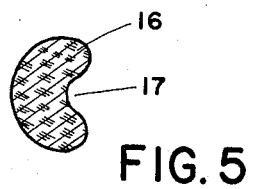
FIG. 5 is a sectional view taken along the line 5—5 of FIG. 1.

The fishing lure 10 of FIGS. 1–4 has a body portion 12 which is provided at the top of the forward end with an eye 14 for attachment to a fishing line. A buoyant member 16 such as a cork provided with an eye 18 on its lower end is connected to the rear portion of the top of the body member 12 by a wire 20. The wire 20 extends longitudinally above the rear half of the body member 12 and the cork or buoyant member 16 is free to move at least along a substantial portion of the wire 20. As will be seen from FIG. 3, the eye 14 is formed at one end of a wire 22 which extends the length of the body member 12. The wire 20 which holds the cork or buoyant member 16 has an end 24 which extends longitudinally within the body member 12. The wire 22 and the end 24 of the wire 20 are encased in a lead mass 26 giving the body member weight.

The end of the wire 22 projecting from the rear of the body member 12 is formed into an eye 28 lying generally in a horizontal plane. A fish hook 30 having an eye 32 lying generally in a vertical plane is connected to the eye 28. Stops 34 may be provided on the eye 28 to limit the movement of the fish hook eye 32. These stops 34 may be formed in any suitable manner, for example, by flattening portions of the eye 28 or by applying small masses of solder to the eye 28. In any event, the stops 34 serve to limit movement of the hook 30 in a horizontal plane to a small acute angle on either side of the longitudinal axis of the body member 12. A small mass of lead or other material 36 may be provided on the shank of the hook 30 adjacent the eye 32 to provide additional weight, if desired.

As will be seen from FIG. 1, skirting 38 may be provided on the body member 12 and skirting 40 provided on the hook 30, the enlargement 36 on the shank of the hook serving as a fastening point for the skirting 40. The skirting 38 and 40 may, for example, be elongated strips of rubber or other thin flexible material and may be of various colors. The purpose of the skirting 38 and 40 is to provide the lure with an appearance which is attractive to the fish. Obviously, other dressings may be used in place of the rubber skirts. For example, feathers, hair, or synthetic fibers may be secured to the body portion 12 and/or to the hook 30 of the lure 10 to provide the desired appearance.

The buoyant member or float 16 preferably has a recess or groove 17 extending vertically on the rear of the member. This groove 17 permits the float to lie closely against the shank of the hook 30, streamlining the lure, so that the float 16 does not prevent or interfer with the biting or swallowing of the lure by a fish.

Figure 6:
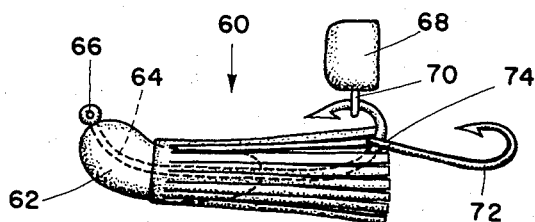
FIG. 6 is a side elevational view of a second embodiment of my invention, with the skirting again removed for clarity.
Figure 7:
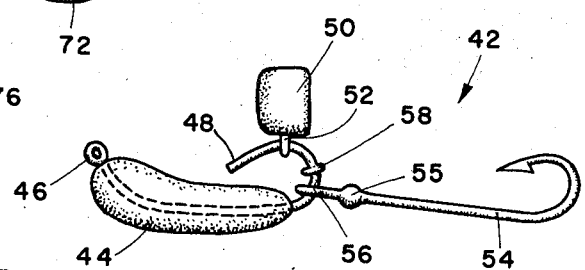
FIG. 7 is a side elevational view of a third embodiment of my invention.

The lure 42 of FIG. 6 has a weighted body portion 44 which is again provided with an eye 46 at the forward end of the top of the body 44 for attaching the lure to a fishing line. The wire forming the eye 46 extends through the body 44 to project from the rear thereof. This projecting end 48 of the wire is bent upwardly to form a loop extending longitudinally above the rear portion of the body 44. A cork or other buoyant member 50 having an eye 52 on its lower surface is received on the wire portion 48. A hook 54 which has an eye 56 extending generally horizontally is also received on the end portion 48 of the wire. If desired, a stop 58 may be provided on the wire 48 to limit movement of the eye 56 of the hook 54. It should be noted that dressings similar to the dressings 38 and 40 of the lure 10 may be provided on the lure 42. An enlargement 55 may be provided on the shank of the hook 54 to provide an attachment point for the skirting. However, such dressings have been omitted from the drawing so that the construction of the lure may be more clearly illustrated.

A third embodiment 60 of the fishing lure of my invention is shown in FIG. 6. In this embodiment a small weighted body portion 62 is provided at the forward end of the shank of a hook 64, the shank extending upwardly through the body portion 62 to provide an eye 66 for attachment to a fishing line. A cork or other buoyant member 68 is attached to the hook 64 by an eye 70, the hook 64 being oriented generally in a vertical plane with the pointed end thereof on the upper side of the hook. The cork or other buoyant member 68 rides near the point of the hook and a second smaller hook 72 having an eye 74 is also carried by the hook 64. The second or smaller hook 72 tends to ride near or below the middle of the curved portion of the hook 64. Any suitable dressings 76 may be provided on the lure 60.

Figure 8:
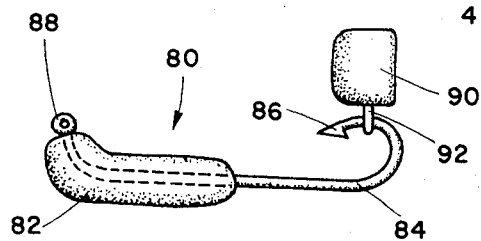
FIG. 8 is a side elevational view of a fourth embodiment of my invention.

A further modification of the fishing lure is illustrated in FIG. 8. The lure 80 of this embodiment has an elongated, weighted body 82 formed by applying lead, solder, or other material to the shank portion of a hook 84. As in the previously described embodiments, the barbed end 86 of the hook is oriented in a vertical plane and above the shank. An eye 88 formed at the opposite end of the hook extends upwardly from the forward end of the body 82 and provides an attachment point for a line. A cork or other buoyant member 90 having a eye 92 projecting from its lower surface is carried on the hook 84 rearwardly of the barbed end 86. As in the other embodiments, skirting is normally provided on the body 82 but has been omitted in the drawing to more clearly show the construction of the lure 80.

When a lure of my invention, for example the lure 10 of FIGS. 1-4, is pulled across the bottom of a lake or stream, the buoyant member 16 tends to hold the elongated body member 12 in a substantially horizontal position. As a result, the forward end of the body member 12 which, as can be seen from the drawings, is rounded tends to glide upwardly over obstructions so that the lure itself does not become snagged. Also, the buoyant member 16 prevents the lure from rotating to either side so that the hook 30 is maintained in a generally vertical plane with the pointed end of the hook uppermost. This further reduces the possibility of snagging. It will be readily apparent that similar action is obtained from the lures of the other embodiments.

If the lures should come to rest on the top of an obstruction, the buoyant member, the float would tend to maintain the lure in this position rather than allowing it to slide downwardly between or to the side of the obstruction. Thus, the lure not only remains in a more snag free position but also remains positioned where it is more readily observed by fish.

The connection between the body portion of the lure and the hook serves to maintain the hook in a vertical position at all times. As was pointed out above, this is advantageous as it minimizes the danger of snagging when the lure is pulled across the lake or stream bottom.

While certain embodiments of the invention have been illustrated and described in detail herein, the invention is not limited thereto or thereby. Rather, changes and modifications may be made to the described embodiments. Reference should thus be had to the appended claims in determining the true scope of the invention.

What is claimed is:

1. A fishing lure, comprising:
a weighted body member wherein the body member is elongated and has a rounded forward end, and having means at the upper surface of the forward end for connection to a fishing line;
a buoyant member;
a wire projecting from the rear of the body member and having an elongated portion extending generally above the body member, the buoyant member being freely slidable and pivotally connected to the wire;
a fish hook; and
swivel connecting means attaching the fish hook to the rear of the body member.

2. The fishing lure according to claim 1 wherein the wire projects above and extends toward the forward end of the body member about one-third the length thereof and the buoyant member has an eye projecting from the lower surface thereof which is slidably received on substantially the full length of the wire.

3. The fishing lure according to claim 2 wherein the buoyant member is cork, and the wire extends about one-third the length of the body member, and the buoyant member can rotate with respect to the wire.

4. The fishing lure according to claim 2 wherein the swivel connection comprises an eye projecting rearwardly from the body member and lying generally in a horizontal plane and an eye at the forward end of the hook oriented generally in a vertical plane and engaging the firstmentioned eye, the pointed end of the hook lying in the same plane as the eye of the hook and above the main portion of the hook.

5. The fishing lure according to claim 4 wherein the eye at the rear of the body member is provided with stops to limit horizontal movement of the hook to a small acute angle on either side of the longitudinal axis of the body member.

6. The fishing lure according to claim 1 wherein the wire comprises a second hook, the buoyant member and the firstmentioned hook each having an eye received on the second hook.

7. The fishing lure according to claim 1 further including skirting covering at least the rear portion of the body member to impart an appearance to the lure which is attractive to fish.

8. A fishing lure, comprising:
an elongated body member weighted at at least its forward end and having means at the upper surface of the forward end for connection to a fishing line;
a buoyant member pivotally connected to the body member and positioned above and generally rearwardly thereof and being freely slidable with respect to the body member;
a fish hook; and
means connecting the fish hook to the rear of the body member and adapted to maintain the hook in a generally vertical plane.

9. A fishing lure according to claim 8 where the buoyant member has groove means thereon formed to nest the fish hook when forced toward the fish hook.

10. The fishing lure according to claim 8 wherein the fish hook has a shank portion extending longitudinally through the body member, the buoyant member being attached to the rear portion of the hook.

11. The fishing lure according to claim 10 wherein the forward end of the shank portion of the hook projects upwardly from the forward end of the body member and is formed into an eye to provide the means for connecting the lure to a fishing line.

* * * * *